Sept. 6, 1927.
F. J. LASS
MECHANICAL MOVEMENT
Filed Jan. 15, 1926
1,641,498
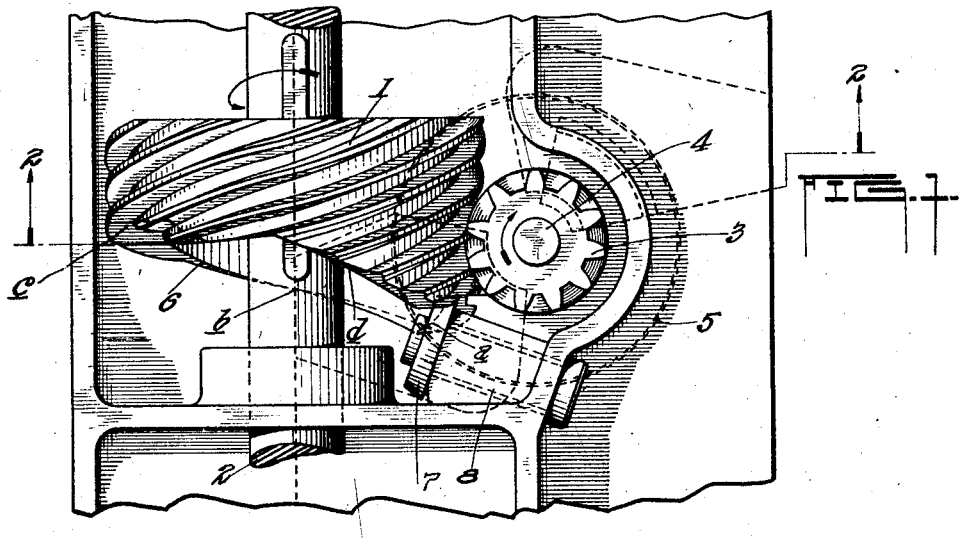
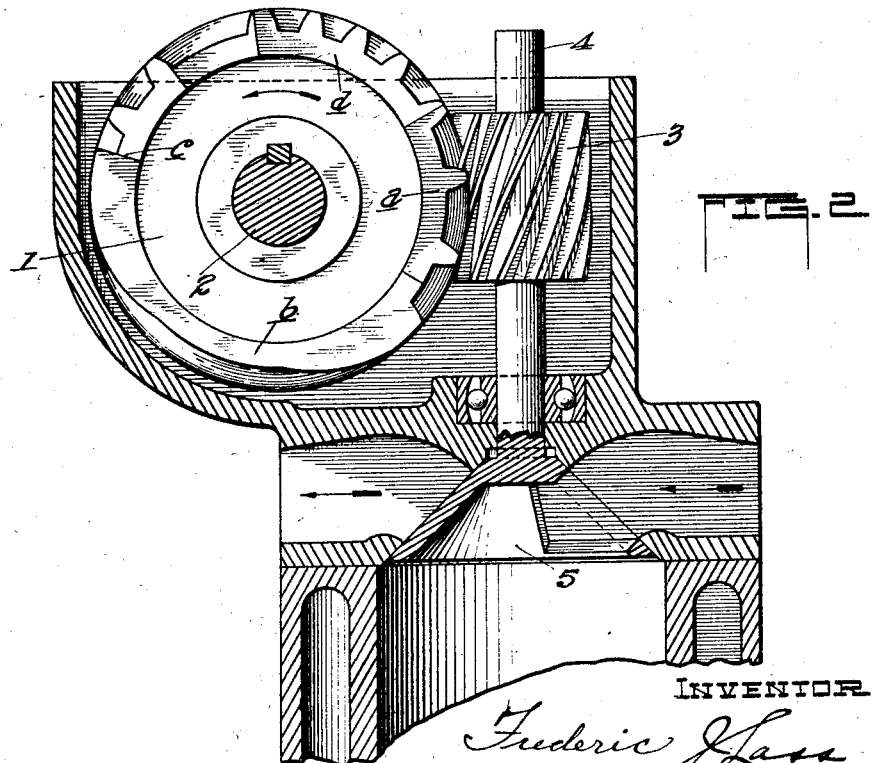
INVENTOR.
Frederic J. Lass
Charles LaPorte
ATTY Patented Sept. 6, 1927.

1,641,498

UNITED STATES PATENT OFFICE.

FREDERIC J. LASS, OF GALESBURG, ILLINOIS, ASSIGNOR OF ONE-HALF TO FRANK M. CONNOLLY, OF GALESBURG, ILLINOIS.

MECHANICAL MOVEMENT.

Application filed January 15, 1926. Serial No. 81,361.

This invention has reference to a mechanical movement by means of which a continuous and rotary driving member is adapted to impart a variable accelerated and retarded movement to a driven member.

The form in which the invention is best adapted is expressed in two intermeshing gears, one of which is the driving gear and the other the driven gear; the driving gear mounted to slide on its shaft and formed or provided with a cam surface engaging a thrust member, whereby, during the rotation of said driving gear its position in respect to said driven gear is changed and is thereby caused to impart a variable accelerated and retarded rotation to said driven gear.

The invention in its practical application is useful as timing gears for operating and controlling the operation of valves for internal combusition engines, which application is herein disclosed, but such disclosure is in no sense intended as a limitation to its uses, as it will be found applicable for many uses where timing gearing is desirable.

In the drawings—

Figure 1 is a plan view of the timing gears as applied to the valve of an internal combustion engine, and Figure 2 is an elevation, in section, as the same would appear if taken on the line 2—2, Figure 1.

For purposes of illustration, the driving gear is designated 1 and is shown slidably connected with, what may be termed the transmission shaft 2, and this shaft, in the embodiment shown, would be driven from a crank-shaft, not shown, of the engine; or in the terminology of the shop, as the two to one shaft. The driven gear is designated 3 and is preferably shown as secured to a valve stem 4, to one end of which is secured a valve member 5 of approved construction. It is obvious from what has already been stated that the details of the means to be operated and controlled is immaterial, in so far as the practial application of the timing gears is concerned.

I prefer to construct the gears, as helical gears, with the driving gear 1 formed or provided with a cam surface 6 on one end and such surface is caused to have contact with and ride on a stationarily positioned roller 7 carried on one end of a shaft 8, journaled in suitable bearings. As the gear 1 is rotated, due to the angularity of the meshing teeth of the two gears and the arrangement of the cam 6, the roller 7 acts, during a partial rotation of the shaft 2, to thrust the gear 1 in one direction on the shaft, whereas during the next succeeding partial rotation of said shaft 2, due to the resistance offered by the teeth on the gear 3, said gear 1 is caused to be thrust in the opposite direction, and thus the cam 6 is in constant contact with the roller 7. Were the two gears of the usual and ordinary type of helical gears, it is obvious that both the driving and driven gears would operate at uniform speed at all times, whether the speed of rotation of said gears was similar or dissimilar. In the arrangement shown, the driving gear 1 is rotated at a constant speed and during such rotation is reciprocated or moved back and forth on its shaft; whereas the transmission of rotation to the driven gear 3 is to impart thereto a variable accelerated and retarded rotative movement. This is accomplished through the peculiar surface formation of the cam 6 on the end of the driving gear 1 and due to its contact with the roller 7. And while I have shown, or preferred to show a certain specific construction of cam to produce a certain and predetermined variable movement to the gear 3, for opening and closing a valve, it is to be understood that it is contemplated to vary the surface formation of the cam end of the gear 1 to produce whatever variable movement may be desired; of course within the range of the practical application of said timing gears.

For convenience, portions of the cam surface are designated $a$, $b$, $c$ and $d$ and the regular or irregular surface formation thereof, as the case may be, at or between these portions as they revolve on or in contact with the roller 7 determines the variable accelerations and retardations in the speed at which the gear 3 is rotated, as it is believed will be understood.

In the position in which the parts are shown, the valve 5 is open admitting the combustible fluid. During the further rotation of the gear 1, in the direction of the arrow indicated on the shaft 2, in Figure 1, the cam 6 will ride on the roller 7 and as that portion of said cam between the points $a$ and $b$ ride over the roller 7 the valve is closed and the compression period takes place. The shape of this part of the cam together with the angularity of the gear teeth, at the pitch line, and the thrust created or caused by the roller 7 will result in the speed of rotation of the gear 3 being accelerated. During the continued rotation of the gear 1 and as the cam 6, between the points *b* and *c* rides over the roller 7 the firing of the combustible fluid takes place. The rotation of the gear 3 during this period is comparatively slow, but during the period when the cam surface between the points *c* and *d* is in contact with the roller 7 the valve is opened at the exhaust side, to permit the exhaust of the products of combustion. For a part of this movement the movement of the gear 3 is accelerated and then retarded or brought approximately to a stand still, gradually increasing, so that as the gear 1 continues its rotation and the cam portion between the points *d* and *a* ride on the roller 7, the valve may be quickly opened, owing to an accelerated movement of the gear 3. No attempt is here made to state the predetermined periods of retardations or gradual or accelerated movements imparted to the gear 3, as all of this is within the range of practice desired and may be provided accordingly.

What I claim is:—

Timing gears, comprising a continuously operated driving gear capable of being reciprocated during its rotative movement and provided with a cam surface on one end, a driven gear in mesh with said driving gear, and a roller contacting with said cam surface; said roller acting during a part of the rotation of said driving gear to thrust the driving gear in one direction and accelerate the rotative movement of said driven gear, and the teeth of the driven gear offering resistance to the driving gear during a part of the rotation thereof to thrust said driving gear in the opposite direction resulting in the retarding of rotation of said driven gear.

In witness whereof, I have hereunto affixed my hand this 12th day of January, 1926.

FREDERIC J. LASS.